United States Patent
Suciu et al.

(10) Patent No.: US 9,352,843 B2
(45) Date of Patent: May 31, 2016

(54) GAS TURBINE ENGINE HAVING FAN ROTOR DRIVEN BY TURBINE EXHAUST AND WITH A BYPASS

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 500 days.

(21) Appl. No.: 13/731,371

(22) Filed: Dec. 31, 2012

(65) Prior Publication Data

US 2014/0183296 A1  Jul. 3, 2014

(51) Int. Cl.
| B64D 27/00 | (2006.01) |
| B64D 27/14 | (2006.01) |
| F02K 3/02 | (2006.01) |
| F02K 3/06 | (2006.01) |
| F02K 3/077 | (2006.01) |
| B64D 27/02 | (2006.01) |

(52) U.S. Cl.
CPC ............. *B64D 27/14* (2013.01); *B64D 27/02* (2013.01); *F02K 3/025* (2013.01); *F02K 3/06* (2013.01); *F02K 3/077* (2013.01)

(58) Field of Classification Search
CPC ........ B64D 33/00; B64D 33/04; B64D 27/10; B64D 27/14; B64D 2027/026; B64D 2027/02; F01D 17/105; F02K 3/04; F02C 9/18
See application file for complete search history.

(56) References Cited

U.S. PATENT DOCUMENTS

| 3,146,590 | A | * | 9/1964 | Erwin | 60/39.17 |
| 3,176,934 | A | * | 4/1965 | Kappus | 244/12.3 |
| 3,279,192 | A | * | 10/1966 | Hull, Jr. et al. | 60/264 |
| 3,312,424 | A | * | 4/1967 | Kappus | 244/12.5 |
| 3,335,976 | A | * | 8/1967 | Kappus | 244/12.3 |
| 3,366,350 | A | * | 1/1968 | Hoffert et al. | 244/55 |
| 3,517,509 | A | * | 6/1970 | Bayati | 60/226.1 |
| 3,659,422 | A | * | 5/1972 | Hope | 60/224 |
| 4,149,374 | A | * | 4/1979 | Barchenko | 60/225 |
| 4,254,619 | A | | 3/1981 | Giffin | |
| 4,462,206 | A | | 7/1984 | Aguet | |
| 4,679,394 | A | | 7/1987 | Taylor | |
| 4,996,836 | A | | 3/1991 | Reh et al. | |
| 5,778,659 | A | | 7/1998 | Duesler | |
| 5,966,525 | A | | 10/1999 | Manzi | |
| 6,260,800 | B1 | | 7/2001 | Snell | |
| 6,409,469 | B1 | | 6/2002 | Tse | |
| 6,439,840 | B1 | | 8/2002 | Tse | |
| 6,837,038 | B2 | * | 1/2005 | Eiler et al. | 60/226.1 |
| 6,845,606 | B2 | * | 1/2005 | Franchet et al. | 60/225 |
| 6,926,232 | B2 | * | 8/2005 | Franchet et al. | 244/53 B |
| 7,107,756 | B2 | | 9/2006 | Rolt | |
| 8,015,796 | B2 | | 9/2011 | Babu et al. | |
| 2012/0128487 | A1 | * | 5/2012 | Eames | 416/1 |

* cited by examiner

Primary Examiner — Philip J Bonzell
(74) Attorney, Agent, or Firm — Carlson, Gaskey & Olds

(57) ABSTRACT

A gas turbine engine has a core engine incorporating a core engine turbine. A fan rotor is driven by a fan rotor turbine. The fan rotor turbine is in the path of gases downstream from the core engine turbine. A bypass door is moveable from a closed position at which the gases from the core engine turbine pass over the fan rotor turbine, and moveable to a bypass position at which the gases are directed away from the fan rotor turbine. An aircraft is also disclosed.

5 Claims, 3 Drawing Sheets

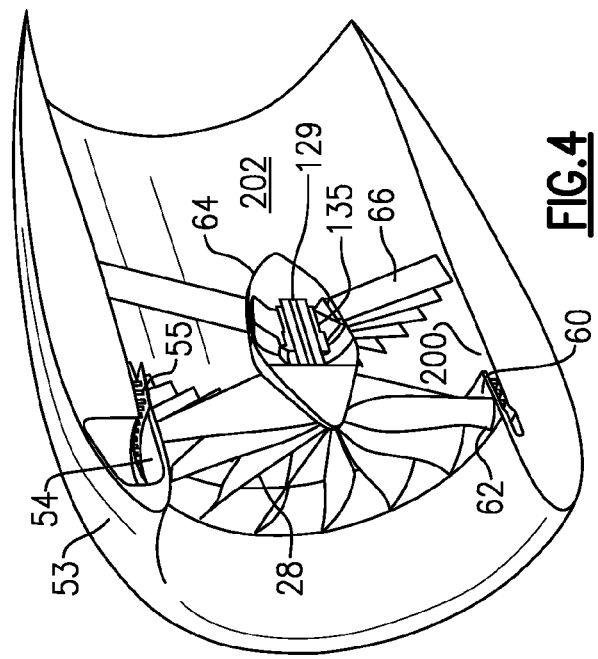
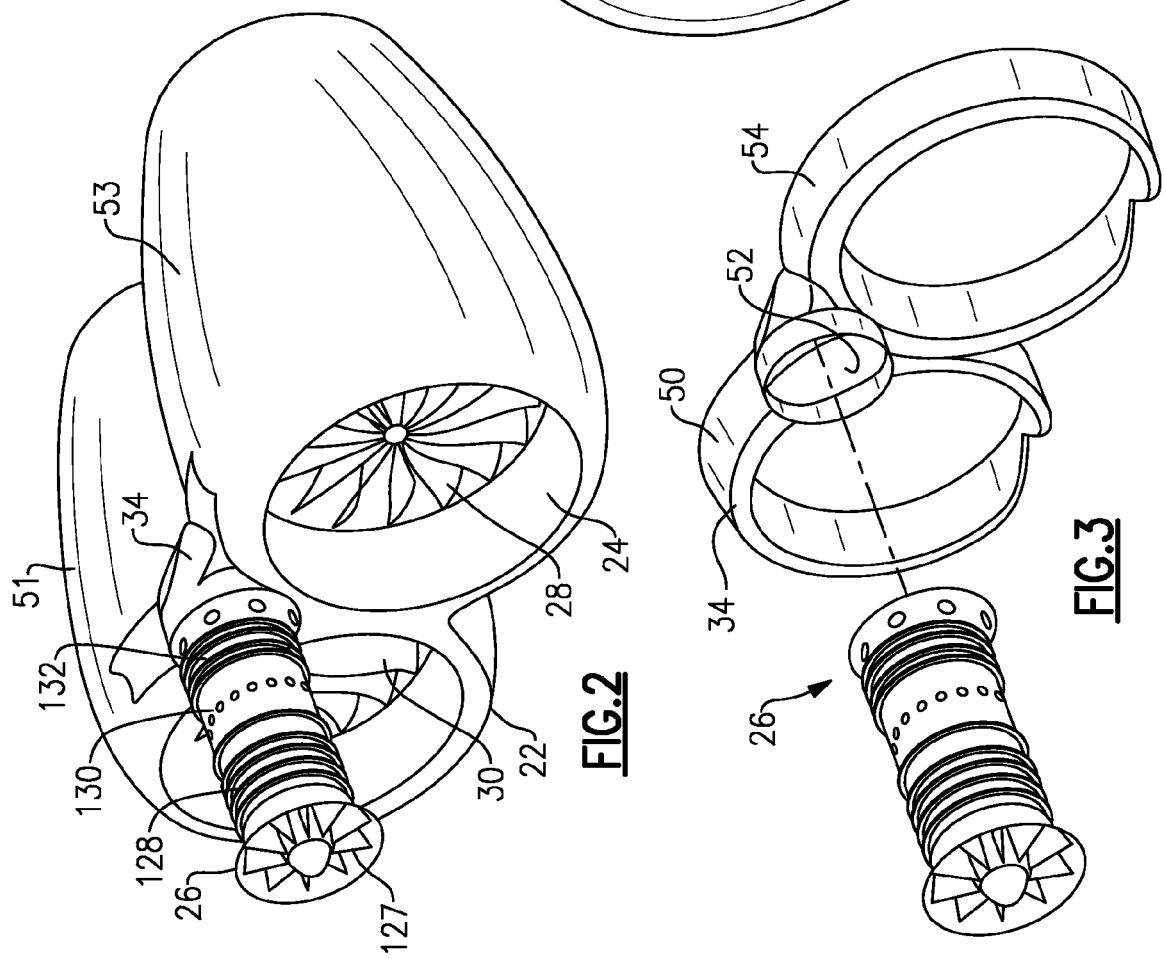

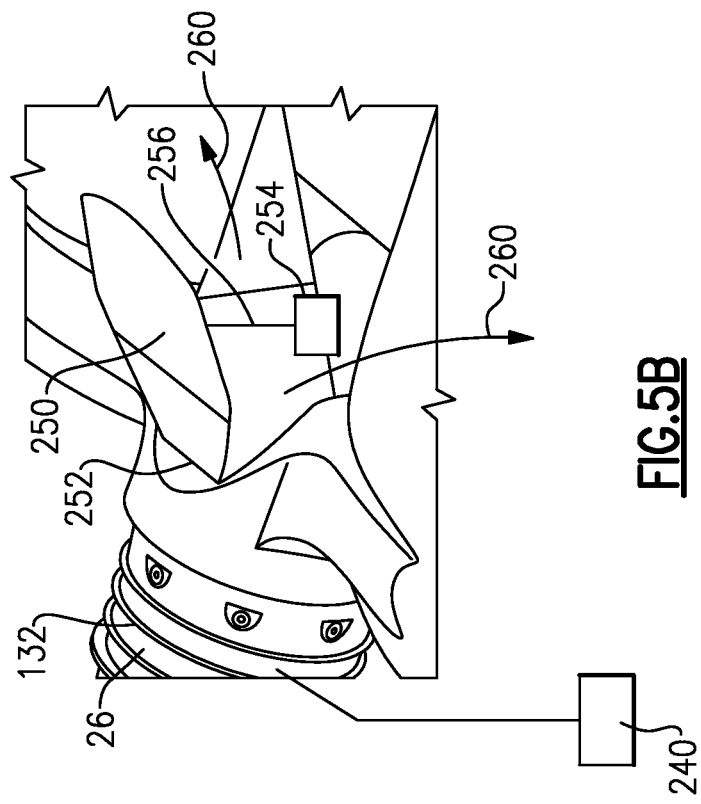
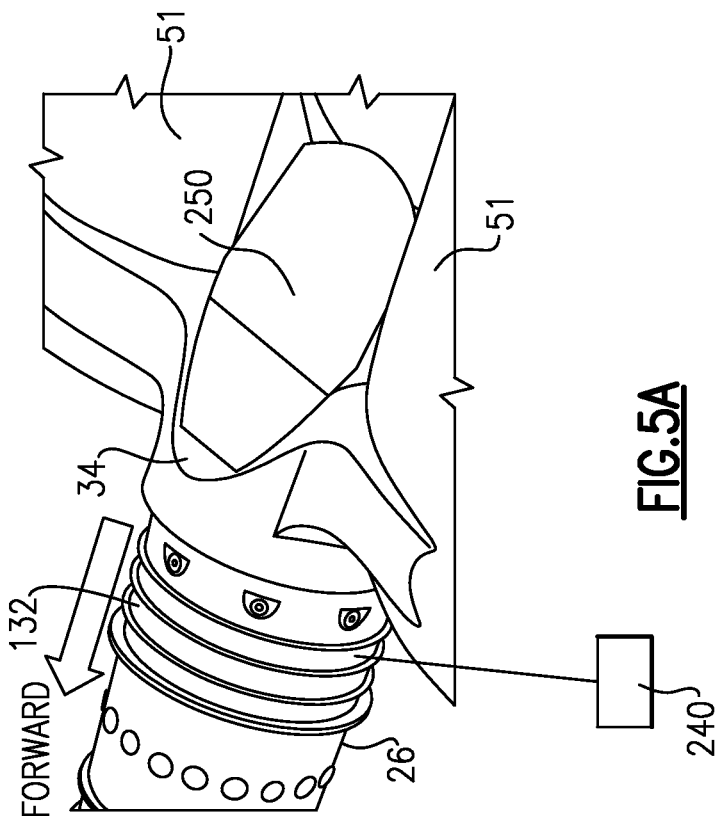
FIG.5A
FIG.5B

US 9,352,843 B2

GAS TURBINE ENGINE HAVING FAN ROTOR DRIVEN BY TURBINE EXHAUST AND WITH A BYPASS

STATEMENT REGARDING FEDERALLY SPONSORED RESEARCH OR DEVELOPMENT

This invention was made with government support under NASA Cooperative Agreement No. NNX11AB35A. The Government has certain rights in this invention.

BACKGROUND OF THE INVENTION

This application relates to an arrangement where a gas turbine engine can bypass a drive for a propulsor.

Gas turbine engines are known, and have typically included a fan delivering air into both a bypass duct as propulsion, and into a core engine. The air leading into the core engine is compressed in a compressor section, mixed with fuel in a combustor section, and ignited. Products of this combustion pass downstream over turbine rotors, driving them to rotate. The turbine rotors in turn mechanically drive the fan and compressor.

While this basic arrangement has proven successful, future aircraft designs require more flexibility.

In addition, most gas turbine engines have a very large fan delivering a high volume of air through the bypass duct, and rearwardly of the aircraft. This makes it difficult to operate the engines while the aircraft is sitting at an airport gate. Thus, it is known to provide an auxiliary power unit (APU) on an aircraft to provide power prior to starting the main gas turbine engine for the aircraft. The APU is essentially a small gas turbine engine that is relied upon to provide power such as from electrical generators prior to the main gas turbine engine starting.

SUMMARY OF THE INVENTION

In a featured embodiment, a gas turbine engine has a core engine incorporating a core engine turbine. A fan rotor is driven by a fan rotor turbine, and is in the path of gases downstream from the core engine turbine. A bypass door is moveable from a closed position at which the gases from the core engine turbine pass over the fan rotor turbine, and moveable to a bypass position at which the gases are directed away from the fan rotor turbine.

In another embodiment according to the previous embodiment, there are a pair of fan rotors each driven by the gases from a single core engine turbine.

In another embodiment according to any of the previous embodiments, the fan rotor turbine is positioned at a radially outer location on the fan rotor.

In another embodiment according to any of the previous embodiments, a manifold receives the gases downstream of the core engine turbine and delivers the gases across both of the fan rotor turbines.

In another embodiment according to any of the previous embodiments, a rotational axis of each fan rotor, and the core engine turbine are all offset relative to each other.

In another embodiment according to any of the previous embodiments, an actuator drives the bypass door to an open position.

In another embodiment according to any of the previous embodiments, the bypass door is driven to the open position when an aircraft receiving the gas turbine engine is at an airport gate.

In another embodiment according to any of the previous embodiments, the core engine turbine drives a generator to generate electricity.

In another embodiment according to any of the previous embodiments, the core engine also includes a compressor and a combustor.

In another featured embodiment, an aircraft has an aircraft body mounting a gas turbine engine. The gas turbine engine includes a core engine incorporating a core engine turbine. A fan rotor is driven by a fan rotor turbine, and is in the path of gases downstream from the core engine turbine, and a bypass door. The bypass door is moveable from a closed position at which the gases from the core engine turbine pass over the fan rotor turbine, and moveable to a bypass position at which the gases are directed away from the fan rotor turbine.

In another embodiment according to the previous embodiment, there are a pair of fan rotors each driven by the gases from a single core engine turbine.

In another embodiment according to any of the previous embodiments, the fan rotor turbine is positioned at a radially outer location on the fan rotor.

In another embodiment according to any of the previous embodiments, a manifold receives the gases downstream of the core engine turbine and delivers the gases across both of the fan rotor turbines.

In another embodiment according to any of the previous embodiments, a rotational axis of each fan rotor, and the core engine turbine are all offset relative to each other.

In another embodiment according to any of the previous embodiments, an actuator drives the bypass door to an open position.

In another embodiment according to any of the previous embodiments, the bypass door is driven to the open position when an aircraft receiving the gas turbine engine is at an airport gate.

In another embodiment according to any of the previous embodiments, the core engine turbine drives a generator to generate electricity.

In another embodiment according to any of the previous embodiments, the core engine also includes a compressor and a combustor.

In another embodiment according to any of the previous embodiments, the aircraft body includes a tail. The gas turbine engine is mounted on the tail.

These and other features of this application will be best understood from the following specification and drawings, the following of which is a brief description.

BRIEF DESCRIPTION OF THE DRAWINGS

FIG. 2 shows an arrangement of a gas turbine engine for the FIG. 1 aircraft.
FIG. 3 is an exploded view of a portion of the FIG. 2 engine.
FIG. 4 shows further detail.
FIG. 5A shows a bypass feature.
FIG. 5B shows a bypass feature actuated.

DETAILED DESCRIPTION

Figure 1:
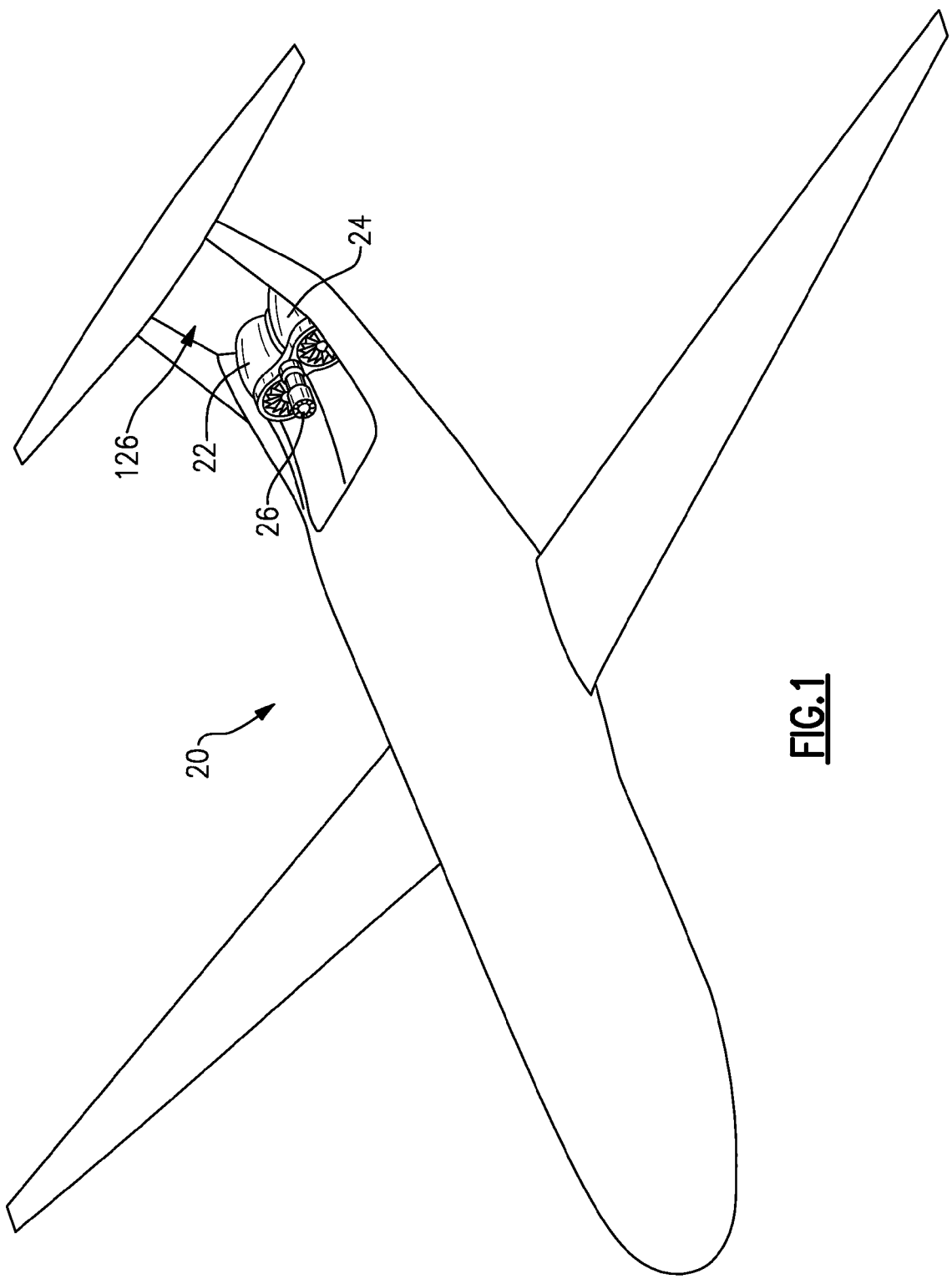
FIG. 1 shows an aircraft.

An aircraft 20 has a tail area 126 provided with a pair of twin propulsor units 22 and 24. The propulsor units include a fan rotor that will drive a large volume of air to provide propulsion for the aircraft. A single gas turbine core engine, or gas generator 26 will drive both propulsor units 22 and 24, as explained below.

As shown in FIG. 2, the core engine 26 includes a frame 127 at a forward end mounting rotating parts of the engine. Although shown schematically, a compressor section 128, a combustor section 130, and a turbine section 132 are all included in the core engine 26. Air passes into the compressor section 128, the combustor section 130, and into the turbine section 132. The turbine section 132 drives the fan 28 and compressor rotors (not shown) within compressor section 128.

Air downstream of the turbine section 132 passes into a manifold 34, and will drive both propulsor units 22 and 24. A first propulsor unit 22 includes a fan rotor 30 received within a nacelle 51. The second propulsor unit 24 includes a fan rotor 28 received within a nacelle 53. The right hand side of FIG. 2 is towards the rear of the aircraft 20 (see FIG. 1). Thus, the gas generator 26 extends forwardly of the propulsor units 22 and 24. One can appreciate rotational axes of fan rotors 28 and 30 and the core engine 26 are all offset from each other.

As shown in FIG. 3, the exhaust from gas generator 26 is received within an opening 52 in the manifold 34, and there are flow distribution members 50 and 54 associated with the first 22 and second 24 propulsor units.

As shown in FIG. 4, the fan rotor 28 has a shaft 129 mounted within bearings 135, and the bearings are mounted within static vanes 66 which are otherwise secured within a nacelle 53. The vanes 66 are downstream of the rotor 28. Rotor 30 is mounted in a similar fashion.

The distribution unit 54 delivers high pressure gas downstream of the turbine section 132 across a tip turbine 55. The tip turbine 55 is driven to rotate by this gas, and in turn drives a ring 60. Ring 60 is fixed to a radially outer portion 62 of the blades in the fan rotor 28. Thus, the turbine 55 drives the fan rotor 28 to rotate. The gases downstream of the tip turbine 55 pass through an outlet 200 and communicate with an interior duct 202 within the nacelle 53, mixing with the air driven by rotor 28.

The single core engine or gas generator 26 is thus able to drive the twin propulsor units 22 and 24, and the overall arrangement fits within the package available on the aircraft 20.

The gas turbine engine described to this point may be generally as disclosed and claimed in co-pending patent application entitled "Twin Tip Turbine Propulsors Powered By a Single Gas Turbine Generator," Ser. No. 13/662,879 filed on Oct. 29, 2012 with.

FIG. 5A shows that a bypass door 250 may be incorporated into the manifold 34. The bypass door 250 is shown in the closed position in FIG. 5A, and the gas turbine engine will operate as disclosed above when the door 250 is in this position. Notably, a generator 240 is shown schematically powered by the turbine 132. The provision of a generator to be powered by a gas turbine engine turbine section is as known.

FIG. 5B shows the bypass door 250 moved to a bypass position. Gases will pass at 260 away from the tip turbines 55 (see FIG. 4). The rotors 28 and 30 will not be driven to rotate. An actuator is illustrated schematically with an actuator drive 254 moving an actuator shaft 256 to cause the bypass door 250 to pivot about a pivot point 252.

The actuator includes a control and it is actuated to move the door 250 to this bypass position when the additional propulsion from the fan rotors 28 and 30 is not desired. As one example, when the aircraft is sitting at a gate, by moving the bypass door 250 to the position illustrated in FIG. 5B, the gas generator 26 may be operated to generate electricity such that the engine can replace the APU as typically required on current aircraft. Though the bypass feature is disclosed in a particular arrangement with twin propulsor units 22 and 24, it may have application in an arrangement where a single fan rotor is driven by exhaust gas downstream of a turbine section.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An aircraft comprising:
   an aircraft body mounting a gas turbine engine, the gas turbine engine including a core engine incorporating a single core engine turbine, a pair of fan rotors each being driven by a fan rotor turbine, and said fan rotor turbines being in the path of gases downstream from said single core engine turbine, and a bypass door, said bypass door being moveable from a closed position at which the gases from the core engine turbine pass over said fan rotor turbine, and moveable to a bypass position at which said gases are directed away from said fan rotor turbine;
   wherein said bypass door is driven to said open position when an aircraft receiving said gas turbine engine is at an airport gate;
   said core engine turbine drives a generator to generate electricity;
   said core engine also includes a compressor and a combustor;
   said aircraft body including a tail, and said gas turbine engine mounted on said tail; and
   the generation of electricity at an airport gate allows the replacement of an auxiliary power unit.

2. The aircraft as set forth in claim 1, wherein said fan rotor turbine is positioned at a radially outer location on said fan rotor.

3. The aircraft as set forth in claim 2, wherein a manifold receives the gases downstream of said core engine turbine and delivers the gases across both of said fan rotor turbines.

4. The aircraft as set forth in claim 1, wherein a rotational axis of each said fan rotor, and said core engine turbine all being offset relative to each other.

5. The aircraft as set forth in claim 1, wherein an actuator drives the bypass door to an open position.

* * * * *